(12) United States Patent
Østberg et al.

(10) Patent No.: US 12,565,425 B2
(45) Date of Patent: Mar. 3, 2026

(54) COMBINATION OF STRUCTURED CATALYST ELEMENTS AND PELLETS

(71) Applicant: HALDOR TOPSØE A/S, Kgs. Lyngby (DK)

(72) Inventors: Martin Østberg, Tune (DK); Kim Aasberg-Petersen, Allerød (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 933 days.

(21) Appl. No.: 17/613,208

(22) PCT Filed: Jun. 22, 2020

(86) PCT No.: PCT/EP2020/067295
§ 371 (c)(1),
(2) Date: Nov. 22, 2021

(87) PCT Pub. No.: WO2021/001189
PCT Pub. Date: Jan. 7, 2021

(65) Prior Publication Data
US 2022/0212928 A1     Jul. 7, 2022

(30) Foreign Application Priority Data
Jul. 3, 2019     (DK) ........................... PA 2019 00820

(51) Int. Cl.
*C01B 3/40*        (2006.01)
*B01J 8/04*        (2006.01)
(Continued)

(52) U.S. Cl.
CPC ............... *C01B 3/40* (2013.01); *B01J 8/0453* (2013.01); *B01J 8/0469* (2013.01); *B01J 8/0496* (2013.01);
(Continued)

(58) Field of Classification Search
CPC .... C01B 3/00; C01B 3/02; C01B 3/32; C01B 3/34; C01B 3/38; C01B 3/382;
(Continued)

(56) References Cited

U.S. PATENT DOCUMENTS 9,365,785 B2 *   6/2016   Bittencourt ............... B01J 23/02
9,943,818 B2 *   4/2018   Jin ............................ B01J 25/02
(Continued)

FOREIGN PATENT DOCUMENTS

GB         2525284 A       10/2015
WO    WO-2010020309 A1 *   2/2010   ............. C01B 3/382
(Continued)

OTHER PUBLICATIONS

Danish Search Report mailed on Jan. 29, 2020 in Danish Application No. PA 2019 00820 by Danish Patent and Trademark Office.
(Continued)

*Primary Examiner* — Natasha E Young
(74) *Attorney, Agent, or Firm* — Boone IP Law

(57) ABSTRACT

A steam reformer is provided which comprises at least one externally-heated tube. Each tube comprises a first catalyst bed comprising a first catalyst in particulate form and a second catalyst supported on a structure, wherein said first catalyst bed is located between the inlet of the tube and the second catalyst supported on said structure. A process for steam reforming of a feed gas mixture using said steam reformer is also provided.

25 Claims, 2 Drawing Sheets

(51) Int. Cl.

| | |
|---|---|
| *B01J 8/06* | (2006.01) |
| *B01J 23/755* | (2006.01) |
| *B01J 37/02* | (2006.01) |
| *B01J 37/03* | (2006.01) |
| *C01B 3/382* | (2026.01) |
| *C01B 3/384* | (2026.01) |

(52) U.S. Cl.
CPC .............. *B01J 8/06* (2013.01); *B01J 23/755* (2013.01); *B01J 37/0225* (2013.01); *B01J 37/03* (2013.01); *C01B 3/382* (2013.01); *C01B 3/384* (2013.01); *B01J 2208/00504* (2013.01); *B01J 2208/025* (2013.01); *C01B 2203/0233* (2013.01); *C01B 2203/062* (2013.01); *C01B 2203/0816* (2013.01); *C01B 2203/1017* (2013.01); *C01B 2203/1035* (2013.01); *C01B 2203/1235* (2013.01)

(58) Field of Classification Search
CPC ....... C01B 3/384; C01B 3/40; C01B 2203/00; C01B 2203/02; C01B 2203/0205; C01B 2203/0227; C01B 2203/0233; C01B 2203/06; C01B 2203/061; C01B 2203/062; C01B 2203/068; C01B 2203/08; C01B 2203/0805; C01B 2203/0811; C01B 2203/0816; C01B 2203/10; C01B 2203/1005; C01B 2203/1011; C01B 2203/1017; C01B 2203/1035; C01B 2203/12; C01B 2203/1205; C01B 2203/1211; C01B 2203/1235
See application file for complete search history.

(56) References Cited

U.S. PATENT DOCUMENTS

| | | | | |
|---|---|---|---|---|
| 9,975,767 | B2 * | 5/2018 | Farnell ................... | B01J 8/067 |
| 2005/0191233 | A1 | 9/2005 | Jiang et al. | |
| 2007/0000173 | A1 | 1/2007 | Boe et al. | |
| 2010/0196776 | A1 | 8/2010 | Ahn et al. | |

FOREIGN PATENT DOCUMENTS

| | | |
|---|---|---|
| WO | 2015132555 A1 | 9/2015 |
| WO | 2018050291 A1 | 3/2018 |

OTHER PUBLICATIONS

International Search Report (PCT/ISA/210) and Written Opinion (PCT/ISA/237) mailed on Sep. 11, 2020, by the European Patent Office as the International Searching Authority for International Application No. PCT/EP2020/067295.

* cited by examiner

COMBINATION OF STRUCTURED CATALYST ELEMENTS AND PELLETS

This application is a national stage application of International Patent Application No. PCT/EP2020/067295, now WO 2021/001189, filed on Jun. 22, 2020, that claims foreign priority to Danish Patient Application No. DKPA 2019 00820, filed on Jul. 3, 2019, the contents of which are incorporated herein by reference.

TECHNICAL FIELD

A steam reformer is provided which comprises at least one externally-heated tube. Each tube comprises a first catalyst bed comprising a first catalyst in particulate form and a second catalyst supported on a structure, wherein said first catalyst bed is located between the inlet of the tube and the second catalyst supported on said structure. A process for steam reforming of a feed gas mixture using said steam reformer, and the use of the steam reformer, are also provided.

BACKGROUND

Steam reforming a feed gas comprising hydrocarbons is a process which has been known for decades. The endothermic steam reforming reaction is typically carried out in a steam reformer, also denoted a steam methane reformer (SMR). A steam reformer has a number of catalyst filled tubes placed in a furnace. The tubes are normally 10-14 meters in length and 7-15 cm in inner diameter. Preferably, the steam reforming takes place at pressures in the range from 15-40 barg to allow for production of a pressured synthesis gas product directly from the reformer. In special cases, steam reforming may take place at pressures down to atmospheric pressure. The heat for the endothermic reaction is supplied by combustion of fuels in burners in the furnace. The synthesis gas exit temperature from the steam reformer depends on the application of the synthesis gas but will normally be in the range from 650° C.-980° C.

One of the principal factors for obtaining effective conversion in catalytic steam reforming is obtaining sufficient heat transfer into the process gas in the tubes, and maintaining sufficient activity of the catalyst.

Steam reforming catalyst is typically included in the reformer tubes in the form of pellets or particles. Pellets provide a high surface area for the reforming reaction, and can be readily manufactured. Research has often focused on improving properties of catalyst pellets such as geometric form, catalytic activity or strength.

Structured steam reforming catalysts are known, in which reforming catalyst is supported on structured elements. This can reduce pressure drop, but affects the overall amount of catalytically active material. Furthermore, for a given amount of poison in the feed gas (such as sulfur-compounds) a lower overall amount of catalyst active material means that the catalyst is more sensitive to poisoning. More extensive catalyst poisoning means reduced activity with the consequence of a lower hydrocarbon conversion. As the temperature of the gas and catalyst in the externally heated tube increases from the inlet to the outlet, this means that relatively higher concentrations of hydrocarbons will be present at higher temperatures. This may result in carbon formation on the catalyst or by cracking on the inner tube surface. This is undesirable as it may lead to higher tube wall temperatures, tube rupture, and/or considerable increase of the pressure drop.

GB 2525 284 discloses a steam reformer in which particulate steam reforming catalyst is adjacent the outlet of the reformer tubes and a structured steam reforming catalyst is adjacent the inlet of the reformer tubes. Additional background is provided in "Catalytic Steam reforming", J. R. Rostrup-Nielsen, in Catalysis—Science and Technology, Vol. 5, Eds. J. R. Anderson & Mi. Boudart, Springer Verlag, 1984.

WO2018/050291 discloses a reformer tube for converting natural gas into a synthesis gas comprising a reaction chamber having a feed gas inlet at the lower end of the reaction chamber, a first catalyst bed of shaped bodies at the lower end of the reaction chamber, a structured catalyst situated above the first catalyst bed through which the gas flows to the upper end of the reaction chamber, from where it is passed downward through a central heat exchange tube and into an outlet chamber situated below the reactions chamber.

US 2010/0196776 discloses an autothermal reformer (ATR) comprising a reaction container having a first opening at its top end for introducing a fuel containing an aqueous fuel solution and hydrogen peroxide, a first granular catalyst disposed adjacent to the first opening, a second catalyst for promoting an autothermal reforming reaction disposed at a rear portion of the first catalyst, and a third catalyst disposed at a rear portion of the second catalyst for promoting an oxidation reaction, wherein the second and third catalysts may be in the form of a monolithic support coated with a catalyst material.

There is still a requirement for obtaining improved structured steam reforming catalysts, while avoiding the problems associated with known steam reformer catalysts with respect to low overall amount of catalyst active material, sulfur poisoning and carbon formation.

SUMMARY

The present invention relates to:

A steam reformer, said steam reformer comprising at least one externally-heated, vertically-arranged tube, said at least one tube(s) comprising an inlet at an upper end of the tube for a feed gas mixture and an outlet at a lower end of the tube for a reformed gas mixture, wherein each tube comprises a first steam reforming catalyst in particulate form; and a second steam reforming catalyst supported on a structure, wherein said first catalyst bed is located between said inlet and said second catalyst supported on said structure.

A process for steam reforming of a feed gas mixture is also provided, said process comprising the steps of:
   a. providing a steam reformer as described herein,
   b. passing feed gas mixture through the at least one tube(s) of said steam reformer from said inlet to said outlet, such that the feed gas mixture first contacts the first catalyst bed and then the second catalyst supported on structure.

The use of the steam reformer as described herein in a process for the synthesis of hydrogen, synthesis gas, ammonia, methanol, DME, urea, hydrocarbons for fuels, gasoline, or reducing gas, is also provided.

Further details of the present technology are presented in the following description, figures and dependent claims.

The use of a catalyst in the form of a catalytic material coated onto a support structure provides the advantage of operating a steam reformer at a increase feed flow rate and hence reforming capacity, since a reformer with such a structured catalyst has a lower pressure drop as compared to a reformer with a catalyst bed of catalyst particles. Also, a structured catalyst potentially has an improved heat transfer capacity as compared to a catalyst bed. However, a structured catalyst has a lower load of catalyst material as compared to a catalyst bed, and hence a structured catalyst has an increased risk of problems due to carbon formation and sulfur poisoning of the catalyst material. The risk is further increased when it is desired to use the steam reformer in a process, wherein the feed gas is not treated in a pre-reformer before entering the steam reactor.

The present invention is based on the recognition that it is possible to avoid the risk of carbon formation and sulfur poisoning of a structured catalyst by passing the feed gas through a catalyst bed of catalyst particles disposed upstream of the structured catalyst, because a bed of catalyst particles has a high load of catalyst material and hence a high capacity for resisting carbon formation and sulfur poisoning and hence it is capable of protecting a downstream structured catalyst against carbon formation and sulfur poisoning.

However, in the case of an up-flow reformer the use of a bed of catalyst particles will involve an upper limit for the feed gas flow capacity due to the risk of fluidization of the catalyst particles. Also, at a fluidization flow rate just below the fluidization flow rate the catalyst particles will move slightly against each other resulting in physical decomposition of the particles by milling. The present invention is further based on the recognition that therefore it is desirable to operate a reformer comprising both a bed of catalyst particles and a structured catalyst as a down-flow reformer. Thus, in such a down-flow reformer it is possible to operate the reformer at a feed gas flow rate potentially at the same high level as a reformer containing only a structured catalyst.

LEGENDS

FIG. 1 shows a first aspect of a steam reformer according to the invention;

FIG. 2 shows a second aspect of a steam reformer according to the invention;

FIG. 3 shows a further aspect of a steam reformer according to the invention; and FIG. 4 shows a further aspect of a steam reformer according to the invention, with a bayonet-type tube.

DETAILED DISCLOSURE

The present invention provides a steam reformer, as illustrated generally in FIGS. 1-4. The steam reformer comprises at least one externally-heated tube, although two or more, such as three or more externally-heated tubes may be used in which each tube has the same arrangement of first catalyst bed and structured steam reforming catalyst. A typical steam reformer for industrial gas conversion comprises 10-500 heated tubes.

A feed gas mixture, typically comprising a hydrocarbon (e.g. methane) and steam, is passed along the tube, and converted to a reformed gas mixture (typically comprising hydrogen and carbon monoxide). Each of the tubes therefore comprises an inlet for a feed gas mixture and an outlet for a reformed gas mixture. Suitably, the inlet and outlet are located at, or near (e.g. within 10 cm from), opposing ends of each tube, so that feed gas mixture passes the substantially the entire length of the tube(s) and is converted over reforming catalyst in its passage from inlet to outlet.

A special case is known as a "bayonet" reformer, (FIG. 4) in which each externally-heated tube comprises two concentric tubes, in which feed gas is passed from the inlet of an outer tube, being packed with catalyst, as per this invention. The feed gas passes along said outer tube (where it reacts to form reformed gas mixture), and then enters the inner tube and is passed along substantially the entire length of the inner tube. In this situation, the "outlet" for reformed gas mixture is considered to be the end of the outer tube where reformed gas exits the outer tube and enters the inner tube. Bayonet reformers have advantages with respect to heat transfer, as the return passage of reacted gas in the inner tube also provides heat to the catalyst.

The steam reformer is arranged vertically, with the inlet arranged above the outlet. Feed gas thus flows downwards. The first catalyst bed therefore occupies the upper portion of the reformer tubes, while the structured catalyst occupies the lower portion of the reformer tubes. The steam reformer may be a side-fired (as shown in FIGS. 1 and 2), top-fired, terrace-fired or bottom-fired reformer, preferably a side-fired or top-fired reformer.

Each tube comprises a first catalyst bed comprising first catalyst in particulate form, and a second catalyst supported on a structure, wherein said first catalyst bed is located between said inlet and said second catalyst supported on a structure. Feed gas mixture therefore passes over the first catalyst bed and then the second catalyst supported on a structure in its passage from inlet to outlet In the first catalyst bed, the first catalyst has particulate form; meaning that it consists of a packed arrangement of catalyst particles, with a defined form. Particle diameters may be from 4 mm to 30 mm preferably 15 to 20 mm. In one embodiment, the first catalyst bed comprises first catalyst in the form of cylindrical pellets, said pellets optionally having one or more through-holes. Cylindrical pellets provide high strength, good gas flow and are relatively easy to produce (e.g. by extrusion) compared to other pellet forms. Cylindrical pellets may have a circular cross-section or an elliptical cross-section. When pellets with a circular cross-section are used they may have a length/diameter ratio in the range 0.4-2.2. Other pellet forms such as rings, cuboids or spheres are, however, possible.

Preferably, the first catalyst comprises particulate refractory support material, preferably a ceramic material, which has been impregnated with or co-precipitated with a catalytically-active metal. Catalytically-active metals for steam reforming include nickel and selected noble metals such as rhodium, iridium and ruthenium. Ceramic materials for the support material include alumina, ceria, zirconia, magnesium aluminate, calcium aluminate, calcium oxides or magnesia.

The first catalyst bed suitably extends between 5-30% of the length of each tube between the inlet and the outlet. The first catalyst bed—in one embodiment—is therefore located adjacent, or substantially adjacent the inlet of each tube. Part or all of the first catalyst bed may extend above the heated length of the tube. In this case part of the first catalyst bed is an adiabatic layer of catalyst pellets.

In a particular embodiment, the geometry of the catalyst particles of the first catalyst bed are selected so that the overall pressure drop over the first catalyst bed is in the range of from 1 to 4 bar, preferably from 1.5 to 3.5 bar, more preferably from 2.0 to 3.0 bar.

In another embodiment illustrated in FIG. 2, at least one of said tubes further comprises a second bed comprising particles, preferably the second bed comprises a third steam reforming catalyst in particulate form. All details of the first catalyst set out above are relevant for the third catalyst, if present.

The second bed is located between the inlet and said first catalyst bed, so that feed gas passes over the second bed, and then the first catalyst bed. In this embodiment the overall amount of catalytically active material is further increased, and the reformer has a further increased sulfur absorption capacity and a further increased resistance to carbon formation.

If present, the catalyst of the second bed may be the same or different to that of the first catalyst bed; in particular the first catalyst may comprises the same catalytically-active metal as the third catalyst. In a particular embodiment, the catalytically active material of the third catalyst is different form the catalytically active material of the first catalyst. In this case, the catalytically active material of the third catalyst may have an increased level of potassium, e.g. a level of from 0.5% to 3%, preferably from 1.0% to 2.5%. Such a catalytically active material has an increased level of resistance to carbon formation.

Alternatively or additionally, the particles of the first catalyst bed and the second bed may differ in terms of their form, size, number of through-holes etc. In a particular embodiment, the geometry of the catalyst particles of the first and second catalyst beds are selected so that the overall pressure drop over the first and second catalyst beds is in the range of from 1 to 4 bar, preferably from 1.5 to 3.5 bar, more preferably from 2.0 to 3.0 bar. In this embodiment, the second bed is located adjacent, or substantially adjacent the inlet of each tube, and the first catalyst bed extends between the second bed and the second catalyst supported on a structure. Additional catalyst beds may be present as required.

A second bed located between the inlet and the first catalyst bed allows separation of the first catalyst bed from the gas inlet, as well as good distribution and warming of gas before it passes over the first catalyst bed. If the second bed comprises catalyst particles, this would also provide increased catalytic activity at the inlet section.

As mentioned above, each reformer tube comprises a second catalyst supported on a structure. The second catalyst supported on a structure is therefore located adjacent, or substantially adjacent the outlet of each tube, i.e. in the lower portion.

The second catalyst supported on a structure is preferably coated on said structure. The structure is typically made of metal or a ceramic material. It suitably has a form which maximises surface area for reaction.

In one aspect, the structure is in the form of cylindrical units with a diameter complimentary to the tubes in which they are placed. The cylindrical units include perforations and/or tubes and/or vanes and/or fins that cause the feed gas to flow both axially and radially as it passes through the units. Promoting gas flow radially increases contact time with the walls of the reformer tube, thus promoting heat transfer to said feed gas. The cylindrical units may be configured to be stackable such that they are self-supported within the tubes. This modular approach supports ease of construction and maintenance of structured catalyst in the reformer tubes.

The first catalyst may comprise the same catalytically-active metal as the second catalyst.

In particular constructions:

the first catalyst bed may extend substantially from said inlet, or—when present—said second bed, to said structure;

the second catalyst supported on a structure may extend substantially from said first catalyst bed, or—when present—said intermediate element, to said outlet.

In a particular embodiment, the pressure drop over the structured catalyst is in the range of from 0.01 to 1.0 bar, preferably from 0.05 to 0.95 bar, more preferably from 0.1 to 0.90 bar, more preferably from 0.2 bar to 0.8 bar.

One or more intermediate elements may be located between the various catalysts in the reformer tubes. For instance, an intermediate element may be located between said first catalyst bed and said structure. This prevents particles from the first catalyst bed entering the structure, where they could interfere with gas flow. Intermediate elements may also be present between first and second beds.

An intermediate element may be a support structure with openings through which catalyst particles of the catalyst beds cannot pass, e.g. a metal mesh structure. Alternatively, the intermediate element may be a third bed of particles, preferably catalytic particles, e.g. steam reforming catalytic particles (so as to minimise the risk of local hot spots being generated within the tubes).

The steam reformer may be heated via heat exchange with a hot gas arranged in the volume around said tubes. The hot gas may be produced by combustion of a fuel in one or more burners located in the volume around the tubes (e.g. in the side-fired arrangement of FIGS. 1-4) or in a separate combustion chamber in fluid connection with the volume around the tubes. Alternatively, the hot gas may be an off-gas or a reformed product gas from another portion of the reforming process/plant. In the case where the hot gas is a reformed product gas from another steam reformer with a higher exit temperature, the reformer of the present invention may be arranged such that the hot gas from one or more other reformers is mixed with the reformed gas mixture from the tubes of the reformer of the present invention. Steam reformers used to provide hot gas may be selected from the group consisting of an autothermal reformer (ATR), a steam methane reforming reactor (SMR), a gas heated reforming reactor, a convective reforming reactor, and/or a catalytic oxidation (CPDX) type reforming reactor.

The steam reformer described herein may be used in conjunction with one or more pre-reformers arranged upstream the steam reformer. The pre-reformers perform an initial reforming reaction on a hydrocarbon feed, so that the feed gas to the steam reformer of this invention is partially reformed when it enters the inlet. The use of pre-reformers allows the degree of reforming to be tailored as required. In a particular embodiment, however, the steam reformer described herein is used without one or more pre-reformers arranged upstream the steam reformer. This is relevant, as the risk of poisoning is higher when a prereformer is not present.

A process for steam reforming of a feed gas mixture is also provided, said process comprising the steps of:

a. providing a steam reformer as described herein; and, b. passing feed gas mixture through the at least one tube(s) of said steam reformer from said inlet to said outlet, such that the feed gas mixture first contacts the first catalyst bed and then the second catalyst supported on structure.

The feed gas is thereby reformed to a reformed gas mixture as it passes along the tube(s). All details described above in relation to the steam reformer are also relevant to the process described herein, mutatis mutandis. In particular, the feed gas mixture may comprise at least 5 ppb of sulfur, such as more than 10 ppb, or more than 20 ppb of sulfur.

The use of the steam reformer as described herein in a process for the synthesis of hydrogen, synthesis gas, ammonia, methanol, DME, urea, hydrocarbons for fuels, gasoline, or reducing gas, is also provided.

The steam reformer of the present invention may be selected from the group consisting of a steam methane reformer, a gas heated reforming reactor and a convective reforming reactor.

The term "steam reformer" is meant to denote a reformer suitable for carrying out steam reforming.

The term "steam reforming catalyst" is meant to denote a catalyst suitable for carrying out steam reforming.

The term "steam reforming" is meant to denote a reforming reaction according to one or more of the following reactions:

$$CH_4+H_2O \leftrightarrow CO+3H_2 \qquad (i)$$

$$CH_4+2H_2O \leftrightarrow CO_2+4H_2 \qquad (ii)$$

$$CH_4+CO_2 \leftrightarrow 2CO+2H_2 \qquad (iii)$$

Reactions (i) and (ii) are steam methane reforming reactions, whilst reaction (iii) is the dry methane reforming reaction.

For higher hydrocarbons, viz. $C_nH_m$, where n≥2, m≥4, equation (i) is generalized as:

$$C_nH_m+nH_2O \leftrightarrow nCO+(n+m/2)H_2 \qquad (iv) \text{ where n≥2, m≥4.}$$

Typically, steam reforming is accompanied by the water gas shift reaction (v):

$$CO+H_2O \leftrightarrow CO_2+H_2 \qquad (v)$$

In most cases, all of these reactions (i)-(v) are at, or close to, equilibrium at the outlet from the reforming reactor. The term "prereforming" is often used to cover the catalytic conversion of higher hydrocarbons according to reaction (iv). Prereforming is typically accompanied by steam reforming and/or methanation (depending upon the gas composition and operating conditions) and the water gas shift reaction. Prereforming is often carried out in adiabatic reactors but may also take place in heated reactors.

Figure 2:
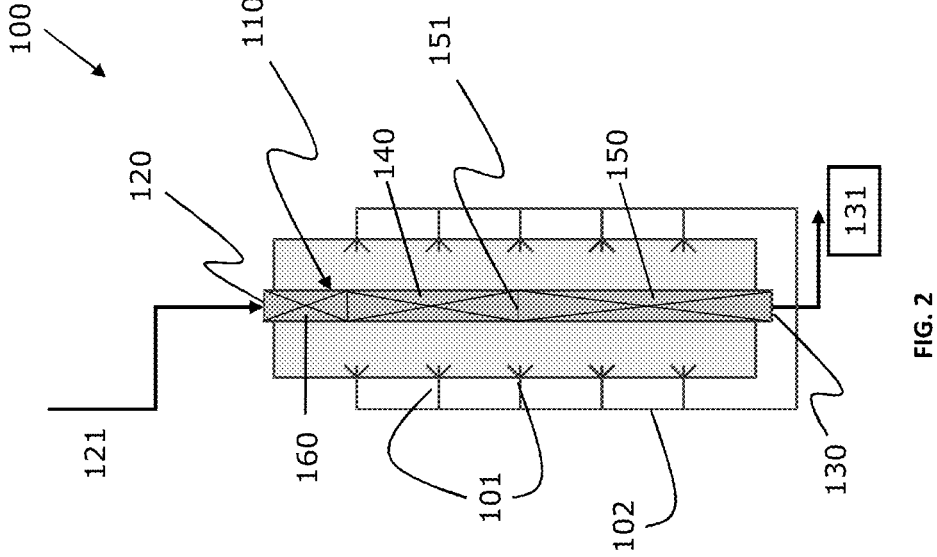

The illustrated steam reformer is a side-fired reformer, and therefore comprises a plurality of burners 101 arranged along the length of the reformer tube(s). Fuel supply 102 is provided for each of the burners 101. An intermediate element 151 is located between the first catalyst bed 140 and the second catalyst supported on a structure 150.

Figure 1:
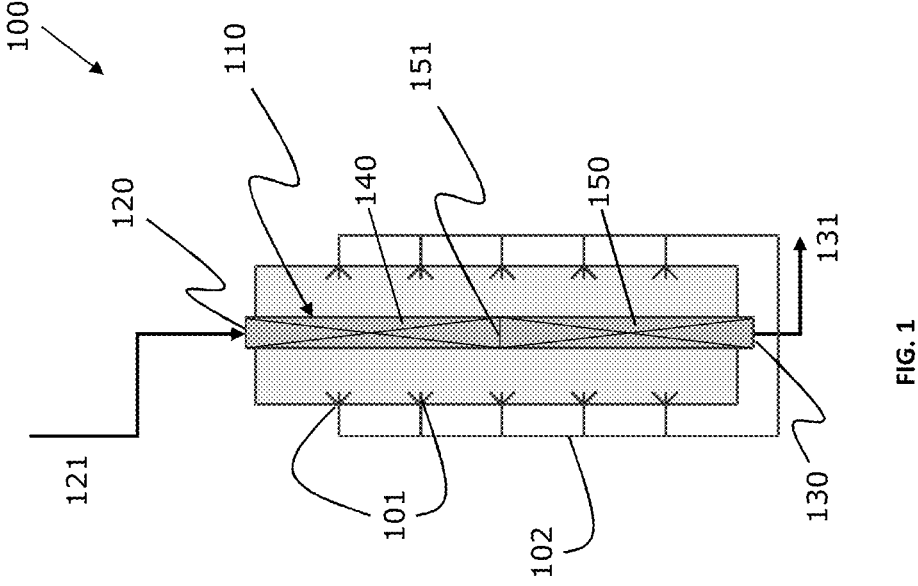
FIG. 1 shows a simplified construction of a steam reformer 100 according to one embodiment. The steam reformer 100 is illustrated with one externally-heated tube 110 for the sake of simplicity, although in practice, many tubes will be present. Feed gas mixture 121 (comprising a hydrocarbon and steam) is fed into the reformer tube 110 via inlet 120, where it passes over first catalyst bed 140, and is at least partially reacted to a reformed gas. The gas then passes over the second catalyst supported on a structure 150, where it is further reacted. Reformed gas mixture 131 exits the reformer tube via outlet 130.

FIG. 2 shows a simplified construction of a steam reformer 100 according to another embodiment. Corresponding features in FIGS. 1 and 2 have the same reference numbers. FIG. 2 also shows a second bed 160 located between the inlet 120 and the first catalyst bed 140.

Figure 3:
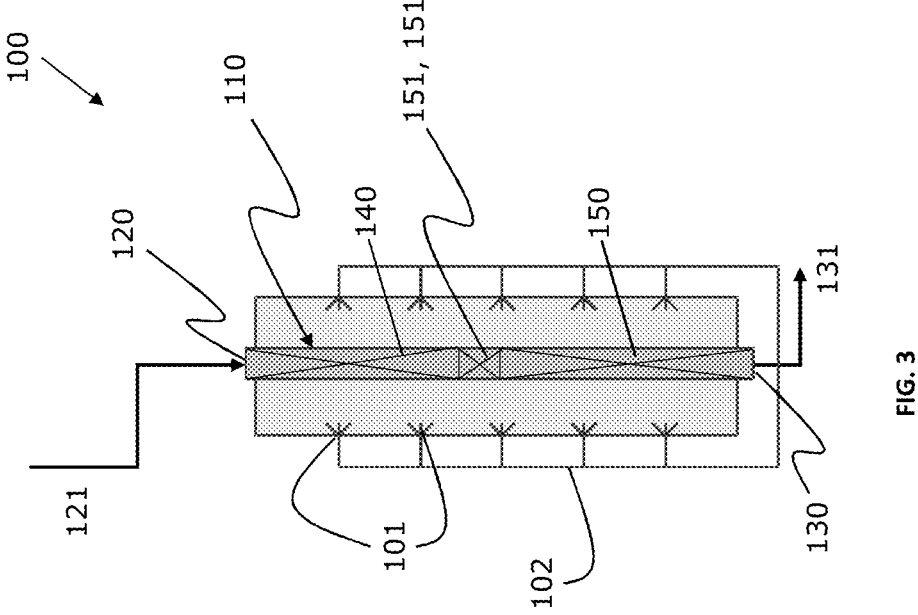

FIG. 3 shows a simplified construction of a steam reformer 100 according to another embodiment. Corresponding features in FIGS. 1 and 3 have the same reference numbers. FIG. 3 is similar to FIG. 1, in which an intermediate element 151 in the form of a third bed 151' located between the first catalyst bed 140 and the second catalyst supported on a structure 150.

Figure 4:
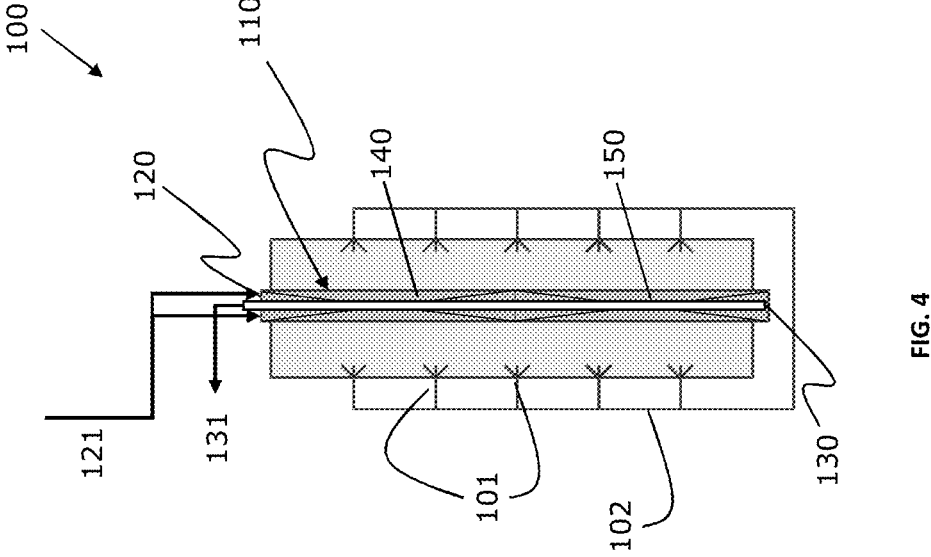

FIG. 4 shows a simplified construction of a steam reformer 100 according to another embodiment. Corresponding features in FIGS. 1 and 4 have the same reference numbers. FIG. 4 is similar to FIG. 1, and illustrates a reformer having bayonet-tubes, as described above.

Example 1

A tubular steam reformer with 336 reformer tubes is loaded with a standard steam reforming particulate catalyst. The particulates are cylindrical with holes. The size of the cylinders is 16 mm in diameter with a height of 11 mm. There are 7 holes in the cylinder along the axis going through the center along the height. Each hole is 3 mm in diameter placed with one in the center of the cylinder and the other 6 symmetrically around the center hole with their center placed on a circumference in a radius of 4.75 mm from the center of the cylinder.

The tubes are placed in a side-fired reformer furnace heated by multiple burners. The length of the tubes is 14 m having a height of the loaded catalyst of 13.5 m. The feed flow of 6547.25 kmole/h is consisting of 29.12 mole % methane, 70.01 mole % of water, 0.54 mole % of carbon dioxide, 0.22 mole % of hydrogen and 0.11 mole % of nitrogen at 883.15 K at a pressure of 291.4 kPa.

The process gas is leaving the tubes at 1127.6 K at a methane content of 5.61 mole %. The pressure drop through the tubes is 139 kPa. The nickel surface area available for reaction in each tube have been determined according to the described method for chemisorption of hydrogen sulfide by Rostrup-Nielsen 1984 to be 239.5 g of sulfur at the start of the run.

Example 2

The steam reformer of example 1 has been filled with structured catalyst elements coated with nickel catalyst. The height of the structured elements is 13.5 m corresponding to the loading height of the particulate catalyst in example 1. Each element has a height of 150 mm and contains a coat of about 36 g. The nickel surface of the coat has been determined in the same manner as the nickel surface area of the particulate catalyst at start of run. The corresponding nickel surface area of each tube is 9.7 g sulfur. The reformer furnace, firing and feed are identical with example 1.

The pressure drop of each tube is 8 kPa and the process gas is leaving the tubes at 1127.6 K at a methane content of 5.72 mole % of methane.

Example 3

The reformer tubes are loaded with a combination of the structured catalyst and particulate catalyst. The lower 12.15 m (90% of the volumetric load) has been loaded with structured catalyst, the upper 1.35 m (10% of the volumetric load) has been loaded with the particulate catalyst described in example 1. The furnace, firing and feed are again identical to example 1. The combined nickel surface area of the two types of catalyst will in this case be corresponding to 32.69 g sulfur. The pressure drop of each tube will be 17 kPa having a methane concentration of 5.71 mole % at the exit.

Example 4

The reformer tubes are loaded with a combination of the structured catalyst and particulate catalyst. The lower 10.80 m (80% of the volumetric load) has been loaded with structured catalyst, the upper 2.70 m (20% of the volumetric load) has been loaded with the particulate catalyst described in example 1. The furnace, firing and feed are again identical to example 1. The combined nickel surface area of the two types of catalyst will in this case be corresponding to 55.67 g sulfur. The pressure drop of each tube will be 26 kPa having a methane concentration of 5.69 mole % at the exit.

Summary of results from above examples.

|  |  | Ex. 1 | Ex. 2 | Ex. 3 | Ex. 4 |
|---|---|---|---|---|---|
| Catalyst pellet | % of height | 100 | 0% | 10% | 20% |
| Sulfur-cap. | g S/tube | 239.5 | 9.71 | 32.69 | 55.67 |
| pressure drop | kPa | 139 | 8 | 17 | 26 |
| Methane outlet | mole % | 5.61 | 5.72 | 5.71 | 5.69 |

This invention has the purpose to ensure that the catalyst bed has capability to resist small amounts of catalyst poisons like e.g. sulfur. The poisons typically act by being reacted or absorbed on the active sites of the catalyst lowering the catalytic activity and—in the worst case—eliminating the activity of the catalyst. The capability to resist this is expressed by the sulfur capacity given in Ex. 1-4. As can be seen from the comparison between a particulate catalyst bed (Ex. 1) and an entirely structured catalyst bed (Ex. 2), the total capability is only about 4% for the structured catalyst bed. A positive result of using a structured catalyst is the lower pressure drop being significantly reduced. By introducing particulate catalyst on top of the structured catalyst, the capability to minimize the consequence of poisons is increased radically and the pressure drop may still be kept much lower than the pressure drop for a bed only with particulate catalyst. The consequence of poisoning of the catalytic bed is less removal of heat inside the tubes as the endothermic reaction of steam reforming will not occur. The increased heating of the unconverted feed may lead to thermal-based reactions such as cracking and formation of coke. Coke deposits on the tubes will act as an insulation layer further contributing to heating of the tubes. This leads to hot banding—overheating of the reformer tube—with the consequence of reduced lifetime or even tube rupture.

The invention has been described with reference to a number of aspects, examples and embodiments. These aspects, examples and embodiments may be combined by the person skilled in the art, while remaining within the scope of the present invention.

The invention claimed is:

1. A steam reformer, said steam reformer comprising at least one externally-heated, vertically-arranged tube, said at least one tube comprising an inlet at an upper end of the tube for a feed gas mixture and an outlet at a lower end of the tube for a reformed gas mixture, wherein each tube comprises: a first catalyst bed comprising a first steam reforming catalyst in particulate form; and a second steam reforming catalyst supported on a structure, wherein said first catalyst bed is located between said inlet and said second catalyst supported on said structure, wherein said at least one tube comprises two or more externally-heated tubes, wherein each tube has the same arrangement of first and second catalysts.

2. The steam reformer according to claim 1, wherein the first catalyst bed extends between 5-30% of the length of the tube between the inlet and the outlet.

3. The steam reformer according to claim 1, wherein at least one of said tubes further comprises a second catalyst bed, said second catalyst bed being located between said inlet and said first catalyst bed.

4. The steam reformer according to claim 1, wherein the steam reformer is a fired reformer.

5. The steam reformer according to claim 1, wherein the at least one tube is a bayonet tube.

6. The steam reformer according to claim 1, wherein the at least one tube is externally heated via heat exchange with a hot gas configured to flow in a volume around said at least one tube.

7. The steam reformer according to claim 6, wherein the hot gas is a reformed product gas from one or more other steam reformers, and wherein the steam reformer is configured such that the hot gas is mixed with the reformed gas mixture from the tubes.

8. The steam reformer according to claim 1, wherein the first catalyst comprises particulate refractory support material, which has been impregnated with or co-precipitated with a catalytically-active metal.

9. The steam reformer according to claim 1, wherein the first catalyst bed comprises first catalyst in the form of cylindrical pellets, said pellets optionally having one or more through-holes.

10. The steam reformer according to claim 9, wherein said cylindrical pellets have a length/diameter ratio in the range 0.4-2.2.

11. The steam reformer according to claim 1, wherein the second catalyst is coated on said structure.

12. The steam reformer according to claim 1, wherein the second catalyst comprises a refractory support material, which has been impregnated with or co-precipitated with a catalytically-active metal.

13. The steam reformer according to claim 1, wherein the structure is made of a metal or ceramic material.

14. The steam reformer according to claim 1, wherein the structure is in the form of one or more cylindrical units which include perforations and/or tubes and/or vanes and/or fins configured to cause the feed gas to flow both axially and radially as it passes through the units.

15. The steam reformer according to claim 14, wherein the cylindrical units are configured to be stackable such that they are self-supported within the at least one tube.

16. The steam reformer according to claim 1, wherein the first catalyst comprises the same catalytically-active metal as the second catalyst.

17. The steam reformer according to claim 1, further comprising one or more intermediate elements located between said first catalyst bed and said structure.

18. The steam reformer according to claim 17, wherein the intermediate element is a third bed of particles.

19. The steam reformer according to claim 17, wherein the intermediate element is a support element.

20. The steam reformer according to claim 1, wherein said feed gas mixture comprises a hydrocarbon and steam.

21. The steam reformer according to claim 1, wherein the first catalyst bed extends substantially from said inlet, or—when present—said second bed, to said structure.

22. The steam reformer according to claim 1, wherein the structure extends substantially from said first catalyst bed, or—when present—said intermediate element, to said outlet.

23. The steam reformer according to claim 1, wherein the steam reformer is configured to be used without one or more pre-reformers arranged upstream said steam reformer.

24. A process for steam reforming of a feed gas mixture, said process comprising the steps of:

a. providing a steam reformer according to claim 1, b. passing feed gas mixture through the at least one tube of said steam reformer from said inlet to said outlet, such that the feed gas mixture first contacts the first catalyst bed and then the second catalyst supported on structure.

25. The process according to claim 24, wherein said feed gas mixture comprises at least 5 ppb of sulfur.

\* \* \* \* \*